US011218104B2

(12) United States Patent
Miyama et al.

(10) Patent No.: US 11,218,104 B2
(45) Date of Patent: Jan. 4, 2022

(54) DYNAMOELECTRIC MACHINE CONTROL METHOD, DYNAMOELECTRIC MACHINE CONTROL DEVICE, AND DRIVE SYSTEM

(71) Applicant: MITSUBISHI ELECTRIC CORPORATION, Chiyoda-ku (JP)

(72) Inventors: Yoshihiro Miyama, Chiyoda-ku (JP); Haruyuki Kometani, Chiyoda-ku (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 11 days.

(21) Appl. No.: 16/961,776

(22) PCT Filed: Feb. 23, 2018

(86) PCT No.: PCT/JP2018/006724
§ 371 (c)(1),
(2) Date: Jul. 13, 2020

(87) PCT Pub. No.: WO2019/163098
PCT Pub. Date: Aug. 29, 2019

(65) Prior Publication Data
US 2020/0389116 A1 Dec. 10, 2020

(51) Int. Cl.
*H02M 1/12* (2006.01)
*H02P 25/22* (2006.01)
*H02P 27/06* (2006.01)

(52) U.S. Cl.
CPC .............. *H02P 25/22* (2013.01); *H02P 27/06* (2013.01)

(58) Field of Classification Search
CPC .. H02P 25/22; H02P 27/06; H02P 6/28; H02P 27/08; H02P 29/50
See application file for complete search history.

(56) References Cited

U.S. PATENT DOCUMENTS

| 2007/0008032 | A1* | 1/2007 | Kyu | ........................ H03F 3/19 330/51 |
| 2007/0230223 | A1* | 10/2007 | Meguro | ................ H02M 7/521 363/41 |
| 2017/0019050 | A1* | 1/2017 | Miyama | ................. H02P 27/08 |

FOREIGN PATENT DOCUMENTS

| JP | 2003-88177 A | 3/2003 |
| JP | 2014-176215 A | 9/2014 |
| JP | 5923215 B2 | 5/2016 |

(Continued)

OTHER PUBLICATIONS

International Search Report dated May 29, 2018 in PCT/JP2018/006724 filed on Feb. 23, 2018, 2 pages.

*Primary Examiner* — Muhammad S Islam
(74) *Attorney, Agent, or Firm* — Xsensus LLP

(57) ABSTRACT

A control method for controlling a three-phase dynamoelectric machine that has phase coils arranged in groups includes setting values of a time phase difference of electric currents to be supplied to the in-phase coils of respective groups and a time phase difference of carrier frequencies with which three-phase inverters are PWM-controlled to satisfy a predetermined relationship among the time phase difference of electric currents, the time phase difference of carrier frequencies, and a space phase difference of in-phase coils of the respective groups. The predetermined relationship is based on a result of a comparison between a current amplitude of a primary component and a current amplitude of a secondary component of a carrier harmonic current.

12 Claims, 12 Drawing Sheets

(56) References Cited

FOREIGN PATENT DOCUMENTS

| WO | WO 2014/132385 A1 | 9/2014 |
| WO | WO 2014/207858 A1 | 12/2014 |

\* cited by examiner

DYNAMOELECTRIC MACHINE CONTROL METHOD, DYNAMOELECTRIC MACHINE CONTROL DEVICE, AND DRIVE SYSTEM

TECHNICAL FIELD

The present invention relates to a control method for a dynamoelectric machine including two or more three-phase windings, a control device for a dynamoelectric machine, and a drive system including the dynamoelectric machine.

BACKGROUND ART

For example, in Patent Literature 1, a related-art dynamoelectric machine including two groups of three-phase windings is described. In the dynamoelectric machine, A-, B-, and C-phases and X-, Y-, and Z-phases form two groups of three phases. The dynamoelectric machine is a six-phase motor, in which windings A, B, and C form one group of three phases, and windings X, Y, and Z form another group of three phases.

In-phase windings of the respective groups are wound with, of a plurality of slots, first and second slot positions that are different in phase by 180 degrees in electric angle being winding start positions, and the second and first slot positions that are different in phase by 180 degrees in electric angle being winding ends.

Further, each winding is wound so that, when the winding that starts being wound from one slot position in a first direction approaches the other slot position, the winding returns to the one slot position side and is wound toward the other slot position in a direction opposite to the first direction.

Still further, winding end points of the three-phase windings of the respective groups are connected in common.

Yet further, to the three-phase windings of the respective groups, AC voltages that are equal in magnitude and inverted in phase are applied.

In Patent Literature 1, harmonics are shifted in phase between two inverters to cancel harmonic components of magnetomotive force generated from the windings among multiple windings in the same slot.

CITATION LIST

Patent Literature

[PTL 1] JP 5923215 B2

SUMMARY OF INVENTION

Technical Problem

Carrier harmonics generally include a plurality of harmonic components, such as a lower sideband and an upper sideband of a primary component, and a lower sideband and an upper sideband of a secondary component. A sideband is a continuous wave other than a carrier wave, which is generated when the carrier wave is modulated by a signal. A sideband that is higher in frequency than the carrier wave is called "upper sideband", and a sideband that is lower in frequency than the carrier wave is called "lower sideband".

As described above, the carrier harmonics include the plurality of harmonic components, but with the method of Patent Literature 1, some of the harmonic components can be reduced, but other components cannot be reduced, or may be increased. Therefore, depending on characteristics or an operating point of the dynamoelectric machine, vibration and sound may be increased on the contrary.

The present invention has been made to solve the above-mentioned problem, and therefore has an object to provide a control method for a dynamoelectric machine, a control device for a dynamoelectric machine, and a drive system, with which harmonic components that are required to be reduced can be reliably reduced.

Solution to Problem

According to the present invention, there is provided a control method for a dynamoelectric machine, which is to be executed in a control device configured to control a voltage to be applied to an N-fold three-phase dynamoelectric machine, where N is an integer of 2 or more, the N-fold three-phase dynamoelectric machine including N groups of phase coils, the phase coils of the N groups being connected to individual three-phase inverters, respectively, the control method for a dynamoelectric machine including setting, when a space phase difference of in-phase coils of the N groups is represented by $\alpha$ in electric angle, a time phase difference of electric currents to be supplied from the individual three-phase inverters to the in-phase coils of the N groups is represented by $\beta$ in electric angle, and a time phase difference of carrier frequencies with which the individual three-phase inverters are PWM-controlled, respectively, is represented by $\gamma$ with respect to one carrier period, values of the time phase difference and the time phase difference $\gamma$ so that any one or both of the following relationships are satisfied: $\gamma = \pm(\alpha + 2\beta - 2\pi/M - 2\pi K)$, and $\gamma = \pm(\alpha - \beta - 2\pi/M - 2\pi K)/2$, based on a result of comparison between a current amplitude of a primary component and a current amplitude of a secondary component of a carrier harmonic current and a value of the space phase difference $\alpha$, and PWM-controlling the individual three-phase inverters to control the voltage to be applied to the N-fold three-phase dynamoelectric machine.

Advantageous Effects of Invention

The control method for a dynamoelectric machine according to the present invention includes setting the values of the time phase difference $\beta$ and the time phase difference $\gamma$ so that any one or both of the following relationships are satisfied: $\gamma = \pm(\alpha + 2\beta - 2\pi/M - 2\pi K)$, and $\gamma = \pm(\alpha - \beta - 2\pi/M - 2\pi K)/2$, based on the result of comparison between the current amplitude of the primary component and the current amplitude of the secondary component of the carrier harmonic current, to control the dynamoelectric machine. The harmonic components that are required to be reduced can be determined based on the comparison result, and hence through setting the values of the time phase difference $\beta$ and the time phase difference $\gamma$ based on the comparison result, the harmonic components that are required to be reduced can be reliably reduced, and vibration and noise can be efficiently reduced.

DESCRIPTION OF EMBODIMENTS

First Embodiment

Figure 1:
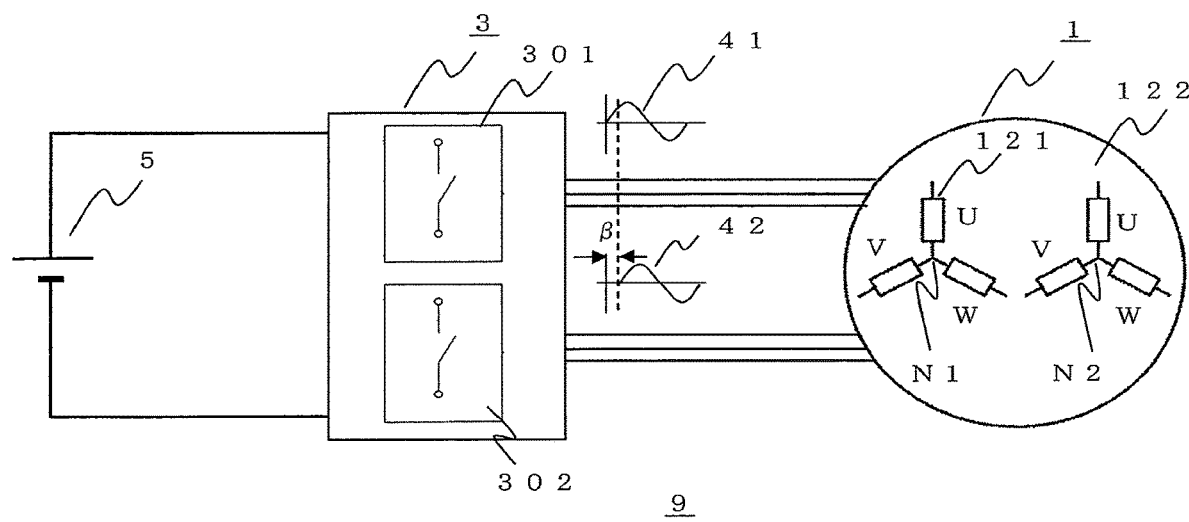
FIG. 1 is a configuration diagram for illustrating a configuration of a multiple three-phase drive system in a first embodiment of the present invention.
Figure 2:
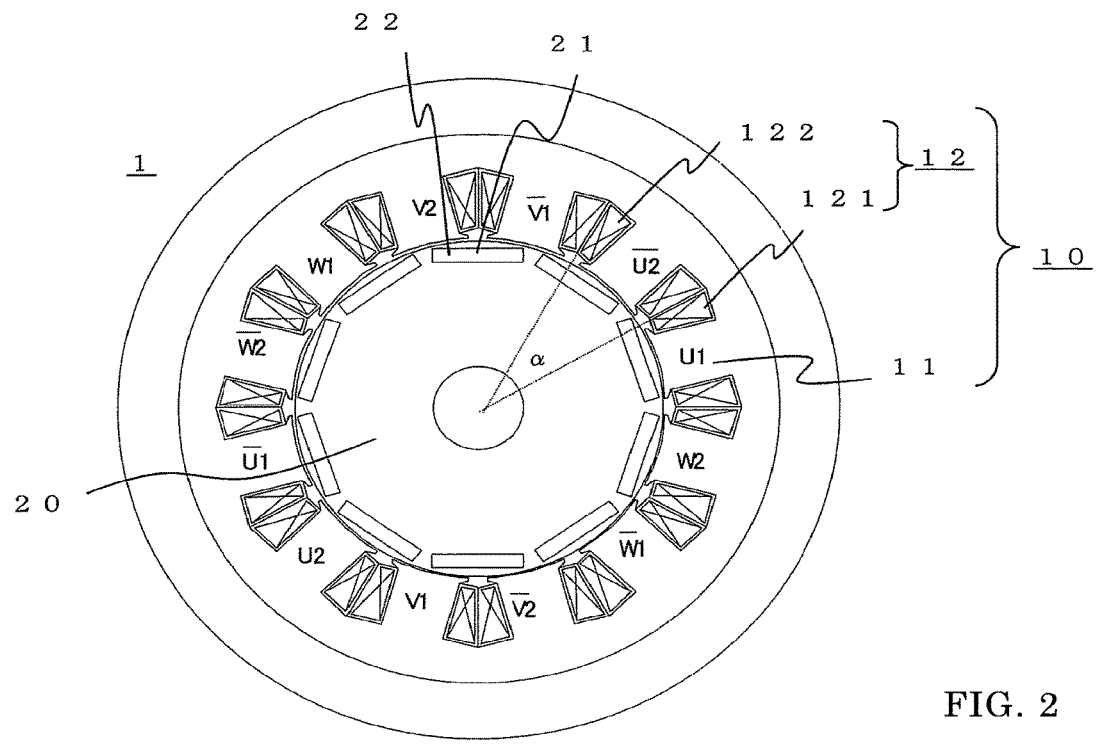
FIG. 2 is a cross-sectional view for illustrating the structure of a multiple three-phase motor in the first embodiment of the present invention.
Figure 3:
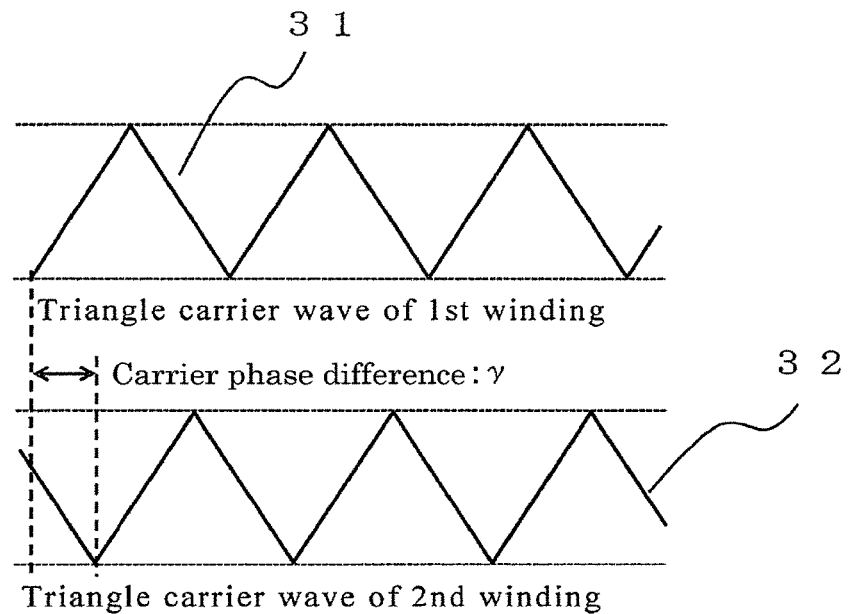
FIG. 3 is a schematic diagram for illustrating a carrier phase difference in the first embodiment of the present invention.
Figure 4:
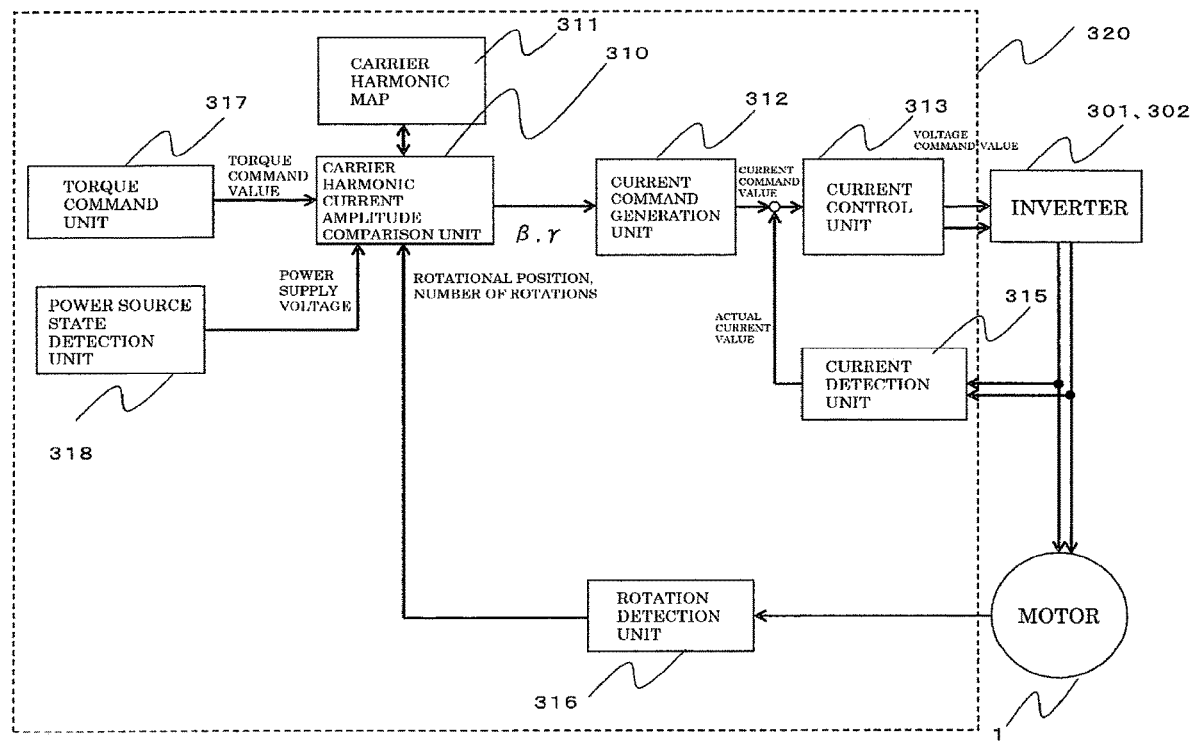
FIG. 4 is a block diagram for illustrating a configuration of a control device according to the first embodiment of the present invention.

FIG. 1 is a diagram for illustrating a configuration of a drive system according to a first embodiment of the present invention. FIG. 2 is a cross-sectional view for illustrating the structure of a dynamoelectric machine in the first embodiment of the present invention. FIG. 3 is a schematic diagram for illustrating a carrier phase difference in the first embodiment of the present invention. FIG. 4 is a block diagram for illustrating a configuration of a control device according to the first embodiment of the present invention.

As illustrated in FIG. 1, a drive system 9 according to the first embodiment is a multiple three-phase drive system. The drive system 9 includes a motor 1 as the dynamoelectric machine, an inverter 3 as a power converter, and a control device 320 configured to control a voltage to be applied to the motor 1 via the inverter 3. The control device 320 is omitted in FIG. 1, and is illustrated in FIG. 4. The motor 1 includes a multiple three-phase dynamoelectric machine, and the inverter 3 includes a multiple three-phase inverter. Hereinafter, as an example of multiple three-phase, a case of dual three-phase is described.

As illustrated in FIG. 1, the inverter 3 is connected to a DC power source 5. The inverter 3 includes two inverters 301 and 302. The inverters 301 and 302 are three-phase inverters.

As illustrated in FIG. 2, the motor 1 is a 10-pole 12-slot concentrated winding dynamoelectric machine. The motor 1 includes a stator 10 and a rotor 20.

The stator 10 has twelve teeth 11. Around the respective teeth 11, phase coils 12 are wound in concentrated winding. The phase coils 12 include a group-1 phase coil 121 and a group-2 phase coil 122. The group-1 phase coil 121 and the group-2 phase coil 122 are alternately wound in a circumferential direction. Further, the group-1 phase coil 121 and the group-2 phase coil 122 are wound in opposite winding directions to each other.

As schematically illustrated in FIG. 1, the group-1 phase coil 121 includes coils of three phases: U-phase, V-phase, and W-phase, and the coils are Y-connected at a neutral point N1. Similarly, as schematically illustrated in FIG. 1, the group-2 phase coil 122 includes coils of three phases: U-phase, V-phase, and W-phase, and the coils are Y-connected at a neutral point N2. The neutral points N1 and N2 are insulated from each other.

The group-1 phase coil 121 is connected to the inverter 301, and the group-2 phase coil 122 is connected to the inverter 302. The inverters 301 and 302 are both connected to the DC power source 5.

Here, U-phase of group 1 and U-phase of group 2 correspond to U-phase of the inverters 301 and 302, respectively, V-phase of group 1 and V-phase of group 2 correspond to V-phase of the inverters 301 and 302, respectively, and W-phase of group 1 and W-phase of group 2 correspond to W-phase of the inverters 301 and 302, respectively. Therefore, U-phase of group 1 and U-phase of group 2, V-phase of group 1 and V-phase of group 2, and W-phase of group 1 and W-phase of group 2 are hereinafter referred to as "in-phase" of the respective groups.

As illustrated in FIG. 2, the rotor 20 has ten magnetic poles 22. The magnetic poles 22 are arranged to be opposed to the stator 10 with N-poles and S-poles being alternately arranged in the circumferential direction. One magnetic pole is formed of one magnet 21. The magnet 21 is arranged in a straight line.

As described above, the stator 10 has twelve teeth 11, and the group-1 phase coil 121 and the group-2 phase coil 122 are wound around the teeth 11 alternately in the circumferential direction. Therefore, the group-1 phase coil 121 is spatially advanced in phase by $2\pi/12=\pi/6$ rad in electric angle ahead of the group-2 phase coil 122. In other words, when a space phase difference of in-phase coils of the respective groups is represented by $\alpha$ in electric angle, $\alpha=\pi/6$ rad. Thus, a value of $\alpha$ is a value determined for each motor 1 based on the number of teeth 11 and a winding method of the group-1 phase coil 121 and the group-2 phase coil 122.

Therefore, before the drive system 9 is started, the value of $\alpha$ is set by a user. As a setting method, the user directly inputs the value of $\alpha$. Alternatively, the user may input the number of teeth and the winding method so that the control device 320 may determine the value of $\alpha$. In that case, for example, the control device 320 may store in advance, in a memory, a data table storing a value of $\alpha$ for each number of teeth and each winding method, and extract and set a corresponding value of $\alpha$ from the data table based on the input number of teeth and winding method.

The inverters 301 and 302 are configured to supply or regenerate three-phase AC power of an appropriate phase to or from the group-1 phase coil 121 and the group-2 phase coil 122, respectively. As illustrated in FIG. 1, a phase difference between the three-phase power supplied to the group-1 phase coil 121 and the three-phase power supplied to the group-2 phase coil 122 is represented by $\beta$. In FIG. 1, the reference numeral 41 indicates a waveform of an electric current for the U-phase coil of group 1, and the reference numeral 42 indicates a waveform of an electric current for the U-phase coil of group 2. The current waveform 41 and the current waveform 42 have a time phase difference $\beta$. Also in V-phase and W-phase, as in U-phase, electric currents for the in-phase coils have a time phase difference $\beta$. Therefore, a time phase difference of electric currents supplied from the individual inverters 301 and 302 to the in-phase coils of the respective groups is hereinafter called "$\beta$" in electric angle.

As illustrated in FIG. 3, the inverters 301 and 302 are PWM-controlled with the same carrier frequency. It should be noted, however, that in a PWM carrier chopping phase between the inverters 301 and 302, when one carrier period is $2\pi$ rad, a time phase difference of $\gamma$ rad is provided. A time phase difference of carrier frequencies 31 and 32 with which the individual inverters 301 and 302 are PWM-controlled, respectively, with respect to one carrier period is hereinafter called "$\gamma$".

As illustrated in FIG. 4, the inverters 301 and 302 are connected to the control device 320. The control device 320 is configured to input voltage command values to the inverters 301 and 302 to PWM-control the inverters 301 and 302.

As illustrated in FIG. 4, the control device 320 includes a carrier harmonic current amplitude comparison unit 310, a carrier harmonic map 311, a current command generation unit 312, a current control unit 313, a current detection unit 315, a rotation detection unit 316, a torque command unit 317, and a power source state detection unit 318.

The carrier harmonic map 311 stores in advance, at each operating point of a rotational speed and torque of the motor 1, information on a carrier primary component and a carrier secondary component of a carrier harmonic current amplitude during PWM driving. In the first embodiment, the carrier harmonic map 311 stores in advance a current amplitude of the carrier primary component and a current amplitude of the carrier secondary component for each rotational speed, torque command value, and power supply voltage.

The torque command unit 317 is configured to calculate a torque required by the motor 1 based on a signal input from the outside, and output the calculated torque as a torque command value.

The power source state detection unit 318 is configured to detect and output a power supply voltage of the DC power source 5 as a power source state of the DC power source 5.

The rotation detection unit 316 is configured to detect the number of rotations or a rotational position of the motor 1, and output the result as the rotational speed of the motor 1.

To the carrier harmonic current amplitude comparison unit 310, the torque command value from the torque command unit 317, the power supply voltage from the power source state detection unit 318, and the rotational speed from the rotation detection unit 316 are input.

The carrier harmonic current amplitude comparison unit 310 is configured to extract, based on the input rotational speed, torque command value, and power supply voltage, the current amplitude of the carrier primary component and the current amplitude of the carrier secondary component that correspond to those values from the carrier harmonic map 311. The carrier harmonic current amplitude comparison unit 310 is configured to compare the extracted current amplitude of the carrier primary component and the extracted current amplitude of the carrier secondary component.

The carrier harmonic current amplitude comparison unit 310 is configured to set, when the current amplitude of the carrier primary component is the current amplitude of the carrier secondary component or more, values of $\beta$ and $\gamma$ to $\beta=5\pi/12$ and $\gamma=0$, respectively, and output the results.

In contrast, when the current amplitude of the carrier primary component is less than the current amplitude of the carrier secondary component, the carrier harmonic current amplitude comparison unit 310 sets the values of $\beta$ and $\gamma$ to $\beta=\pi/6$ and $\gamma=\pi/2$, respectively, and outputs the results.

The values of $\beta$ and $\gamma$ vary for each value of $\alpha$, and hence the carrier harmonic current amplitude comparison unit 310 may store in advance, in a data table, the values of $\beta$ and $\gamma$ for each value of $\alpha$, and extract and determine the values from the data table. Alternatively, the carrier harmonic current amplitude comparison unit 310 may store in advance arithmetic expressions (4) to (8), which are to be described later, and determine the values of $\beta$ and $\gamma$ by an operation using the arithmetic expressions. The arithmetic expressions are not necessarily all stored; for example, only (4), (5), (7), and (8) may be stored. A method of calculating the values of and $\gamma$ is described later.

To the current command generation unit 312, the values of $\beta$ and $\gamma$ are input from the carrier harmonic current amplitude comparison unit 310. The current command generation unit 312 is configured to generate a current command value based on the input values of $\beta$ and $\gamma$. In other words, the current command generation unit 312 is configured to generate the current command value so that the time phase difference of the electric currents of the in-phase coils of the respective groups is $\beta$, and the time phase difference of the carrier frequencies of the respective groups is $\gamma$ in electric angle with respect to one carrier period.

The current detection unit 315 is configured to detect an actual current allowed to pass through the motor 1.

To the current control unit 313, the current command value from the current command generation unit 312, and the actual current of the motor 1, which has been detected by the current detection unit 315, are input. The current control unit 313 is configured to feedback-control the actual current of the motor 1 so that the actual current of the motor 1 follows the current command value to generate the voltage command values.

The inverters 301 and 302 are configured to supply AC power to the motor 1, or regenerate AC power from the motor 1 based on the voltage command values from the current control unit 313.

Next, operation is described.

As described above, the motor 1 is a dual three-phase dynamoelectric machine, and the space phase difference of the in-phase coils of the group-1 phase coil 121 and the group-2 phase coil 122 is $\alpha$ in electric angle. In the first embodiment, $\alpha=\pi/6$.

The motor 1 is connected to the inverters 301 and 302. The inverters 301 and 302 are dual three-phase inverters. Further, the time phase difference of the electric currents supplied to the in-phase coils of the group-1 phase coil 121 and the group-2 phase coil 122 by the inverters 301 and 302, respectively, is $\beta$ in electric angle. Still further, the time phase difference of the carrier frequencies with which the inverters 301 and 302 are PWM-controlled, respectively, is $\gamma$ in electric angle with respect to one carrier period.

In the control device 320, the carrier harmonic current amplitude comparison unit 310 extracts, based on the torque command value from the torque command unit 317, the rotational speed of the motor 1, and the power supply voltage of the DC power source 5, the current amplitude of the carrier primary component and the current amplitude of the carrier secondary component that correspond to those values from the carrier harmonic map 311. The carrier harmonic current amplitude comparison unit 310 compares the current amplitude of the carrier primary component and the current amplitude of the carrier secondary component. The current amplitude of the carrier primary component and the current amplitude of the carrier secondary component are changed in magnitude relationship depending on operating conditions of the motor 1.

The carrier harmonic current amplitude comparison unit 310 sets, when the current amplitude of the carrier primary component is the current amplitude of the carrier secondary component or more as a result of the comparison, the values of $\beta$ and $\gamma$ to $\beta=5\pi/12$ and $\gamma=0$, respectively. In contrast, when the current amplitude of the carrier primary component is less than the current amplitude of the carrier secondary component, the carrier harmonic current amplitude comparison unit 310 sets the values of $\beta$ and $\gamma$ to $\beta=\pi/6$ and $\gamma=\pi/2$, respectively.

The current command generation unit 312 generates the current command value based on the values of $\beta$ and $\gamma$. The current control unit 313 feedback-controls the actual current of the motor 1 based on the current command value from the current command generation unit 312 so that the actual current of the motor 1, which has been detected by the current detection unit 315, follows the current command value to generate the voltage command values.

The inverters 301 and 302 supply AC power to the motor 1, or regenerate AC power from the motor 1 based on the voltage command values from the current control unit 313.

Principles underlying, and effects obtained by, the multiple three-phase drive system in the first embodiment having the above-mentioned configuration are described below.

A radial electromagnetic force fr ($\theta$, t) generated in an inner circumferential surface of a stator core of the stator 10 of the motor 1 becomes an exciting source of electromagnetic vibration and noise, where $\theta$ represents a position in the circumferential direction, and t represents time. The radial electromagnetic force fr ($\theta$, t) can be expressed as the following expression (1) based on Maxwell's stress equation.

[Expression 1]

$$f_r(\theta, t) = \frac{B_{gr}^2(\theta, t) - B_{g\theta}^2(\theta, t)}{2\mu_0} \quad (1)$$

In the expression (1), Bgr and Bg$\theta$ represent a radial component and a circumferential component of a magnetic flux density generated in the gap between the stator 10 and the rotor 20 of the motor 1, respectively, and $\mu_0$ represents a magnetic permeability under a vacuum state.

The radial component Bgr of the magnetic flux density generated in the gap between the stator 10 and the rotor 20 of the motor 1 can generally be expressed, in an N-fold three-phase motor, by addition of a component Bgr1 generated by the group-1 phase coil 121, a component Bgr2 generated by the group-2 phase coil 122, . . . , and a component BgrN generated by a group-N phase coil as in the following expression (2). Here, N is an integer of 2 or more.

[Expression 2]

$$B_{gr}(k, n, m) = \quad (2)$$
$$B_{gr1}(k, n, m) + B_{gr2}(k, n, m) + \ldots = \sum_N \sum_k \sum_n \sum_m A_{gr}(k, n, m) \cos$$
$$\{k(\theta - \alpha_N) - n(\omega t - \beta_N) - m(\omega_c t - \gamma_N) + \varphi(k, n, m)\}$$

In the expression (2), k, n, and m represent a space harmonic order, a time harmonic order, and a carrier harmonic order, respectively. Ag (k, n, m) is an amplitude of a magnetic flux density for each space harmonic order k, time harmonic order n, and carrier harmonic order m. Further, $\theta$ represents a space position, $\omega$ represents each frequency of a fundamental wave, $\omega_c$ represents each frequency of a carrier, and t represents time. Still further, $\alpha_N$ represents a space phase, $\beta_N$ represents a time phase, $\gamma_N$ represents a carrier phase, and $\psi$ (k, m, n) represents a constant. Yet further, N represents a group. When the space phase difference, the time phase difference, and the carrier phase difference of the respective groups are the same, and are represented by $\alpha$, $\beta$, and $\gamma$, respectively, a phase difference between each pair of adjacent groups is k$\alpha$–n$\beta$–m$\gamma$. Further, a circumferential magnetic flux density component can be expressed similarly to the above-mentioned expression (2).

In a voltage source PWM inverter, a current waveform includes a carrier harmonic n$\omega$±m$\omega_c$ including sideband components. Here, n and m have the following relationships.

n=±(6j+3±1), where the double signs correspond to each other, when m is an odd number.

n=±(6j±1), where the double signs correspond to each other, where m is an even number.

In the above-mentioned relationships, j is 0, 1, 2 . . . . Therefore, –2$\omega$±$\omega_c$ is generated as a main component in the carrier primary component, and $\omega$±2$\omega_c$ is generated as a main component in the carrier secondary component. In the carrier primary component, k=1, n=–2, and m=±1, and in the carrier secondary component, k=1, n=1, and m=±2.

Here, in those carrier harmonic components, when air-gap magnetic flux densities of the respective groups are vector-synthesized to be 0, the electromagnetic force is cancelled, and the vibration and noise can be reduced. When this principle is applied to suppression of the carrier harmonic, only the carrier harmonic components can be suppressed without changing an impedance of a fundamental wave component.

To that end, in harmonic components having a desired phase difference of the respective groups, and when M is any number that is a measure of N excluding 1 in N-fold three-phase, it is only required that the following expression (3) be satisfied. In the expression (3), K is an integer.

$$k\alpha - n\beta - m\gamma = 2\pi/M + 2nK (K \text{ is an integer.}) \quad (3)$$

In the primary component, $\alpha$, $\beta$, and $\gamma$ have relationships of the following expressions (4) and (5) for upper and lower sideband components, respectively.

$$\gamma = -(\alpha + 2\beta - 2\pi/M - 2\pi K_{1H}) \quad (4)$$

$$\gamma = \alpha + 2\beta - 2\pi/M - 2\pi K_{1L} \quad (5)$$

Therefore, in order to reduce the carrier harmonic components of both the upper and lower sidebands, it is only required that the right side of the expression (4) and the right side of the expression (5) be equal to each other, and hence that a relationship of the following expression (6) be satisfied.

$$\alpha + 2\beta = 2\pi/M + \pi K_{1L} + \pi K_{1H} \quad (6)$$

Here, the space phase difference α of the windings is π/6, and M=2. Therefore, β=5π/12 based on the expression (6). Then, γ=0 based on the expressions (4) and (5).

In the secondary component, α, β, and γ have relationships of the following expressions (7) and (8) for upper and lower sideband components, respectively.

$$\gamma = -(\alpha - \beta - 2\pi/M - 2\pi K_{2L})/2 \quad (7)$$

$$\gamma = (\alpha - \beta - 2\pi/M - 2\pi K_{2H})/2 \quad (8)$$

Here, the space phase difference a of the windings is π/6, and M=2. Therefore, based on the expressions (7) and (8), the following expressions (9) and (10) are obtained, and have two solutions in a range of from 0 rad to 2π rad.

$$\gamma = 5\pi/12 + \beta/2 + \pi K_{2L} \quad (9)$$

$$\gamma = -5\pi/12 - \beta/2 - \pi K_{2H} \quad (10)$$

Therefore, the solutions for cancelling both of the upper and lower sidebands may be β=π/6 and γ=π/2 or 3π/2, or β=7π/6 and γ=0.

As described above, in the first embodiment, when the current amplitude of the primary component of the carrier harmonic current is the current amplitude of the secondary component or more, the values of β and γ are set so that β=5π/12 and γ=0, respectively. Therefore, a magnetic flux density of the carrier primary component can be cancelled, and electromagnetic exciting forces can be reduced. In contrast, when the current amplitude of the primary component of the carrier harmonic current is less than the current amplitude of the secondary component, the values of β and γ are set so that β=π/6 and γ=π/2, respectively. Therefore, a magnetic flux density of the carrier secondary component is cancelled, and the electromagnetic exciting force is reduced. Thus, in the first embodiment, the current amplitude of the primary component and the current amplitude of the secondary component are compared with each other, and the carrier harmonic component having the higher current amplitude can be selectively reduced based on the result of the comparison. When the carrier harmonic component is reduced, the electromagnetic exciting force caused thereby can be reduced, and hence the electromagnetic vibration and noise of the motor 1 can be effectively reduced.

In the above description, it is described that, when the current amplitude of the primary component of the carrier harmonic current is less than the current amplitude of the secondary component, the inverters 301 and 302 are PWM-controlled so that β=π/6 and γ=π/2. However, the present invention is not limited to that case, and the values of β and γ may be set so that β=π/6 and γ=3π/2, or β=7π/6 and γ=0, respectively. Also in that case, similar effects are obtained.

Further, in the above description, the motor 1 is Y-connected, but also when the motor 1 is Δ-connected, the similar effects are obtained.

Still further, in the above description, the time phase difference β of the electric currents and the carrier phase difference γ are determined so that both of the upper and lower sidebands of each order component of the carrier harmonic component are reduced at the same time, but the time phase difference β of the electric currents and the carrier phase difference γ may be determined so that one of the upper and lower sidebands is reduced. For example, when the values of β and γ are set so that β=π/6 and γ=3π/2, respectively, for the carrier secondary component, only the upper sideband can be reduced. In this manner, the electromagnetic exciting force can be reduced with α=β without reducing the number of winding systems.

As described above, in the first embodiment, to the motor 1 in which the space phase difference of the in-phase coils of the respective groups is a in electric angle, an N-fold three-phase inverter 3 is connected. In the N-fold three-phase inverter 3, the time phase difference of the electric currents supplied from the individual inverters 301 and 302 to the in-phase coils of the respective groups is β in electric angle, and the time phase difference of the carrier frequencies with which the individual inverters 301 and 302 are PWM-controlled, respectively, is γ in electric angle with respect to one carrier period. Then, the control device 320 is configured to PWM-control the inverters 301 and 302 so that at least one of the following relationships is satisfied: γ=±(α+2β−2π/M−2πK), and γ=±(α−β−2π/M−2πK)/2, based on the result of comparison between the current amplitudes of the primary component and the secondary component of the carrier harmonic current, to thereby control the voltage to be applied to the motor 1.

Specifically, when, of electromagnetic exciting forces of the primary component and the secondary component of the carrier harmonic, the electromagnetic exciting force of the primary component is larger, the control device 320 PWM-controls the inverters 301 and 302 so that the relationship of γ=±(α+2β−2π/M−2πK) is satisfied, to thereby cancel the magnetic flux density of the primary component, and reduce the electromagnetic exciting force of the primary component. In contrast, when the electromagnetic exciting force of the secondary component is larger, the control device 320 PWM-controls the inverters 301 and 302 so that the relationship of γ=±(α−β−2π/M−2K)/2 is satisfied, to thereby cancel the magnetic flux density of the secondary component, and reduce the electromagnetic exciting force of the secondary component.

Thus, the control device 320 determines the harmonic component that is required to be reduced based on the result of comparison between the current amplitudes of the primary component and the secondary component of the carrier harmonic current, and sets the values of β and γ so as to reduce the harmonic component. As a result, there can be obtained the effects that the harmonic component can be reliably reduced, and that the electromagnetic exciting force can be reduced efficiently. Further, when both of the primary component and the secondary component are to be reduced, the control device 320 PWM-controls the inverters 301 and 302 so that both of the following relationships are satisfied: γ=±(α+2β−2π/M−2πK), and γ=±(α−β−2π/M−2πK)/2.

Further, in the first embodiment, it is possible to determine the values of β and γ before the drive system 9 is started, but at least one of β or γ may be variable during the operation of the drive system 9. For example, when the electromagnetic exciting forces of the primary component and the secondary component of the carrier harmonic are changed in magnitude relationship with changes in the number of rotations, torque, and the power supply voltage of the motor 1 during operation, at least one or both of β and γ may be changed to reduce the carrier harmonic with the larger electromagnetic exciting force. As a result, the harmonic component that is required to be reduced can be reduced intentionally during operation, and the electromagnetic exciting force can be reduced efficiently.

Still further, in the first embodiment, it is described that each magnetic pole 22 is formed of one magnet 21 arranged in a straight line. However, the present invention is not limited thereto, and each magnetic pole 22 may include two magnets 21 arranged in a V shape.

Second Embodiment

Figure 5A:
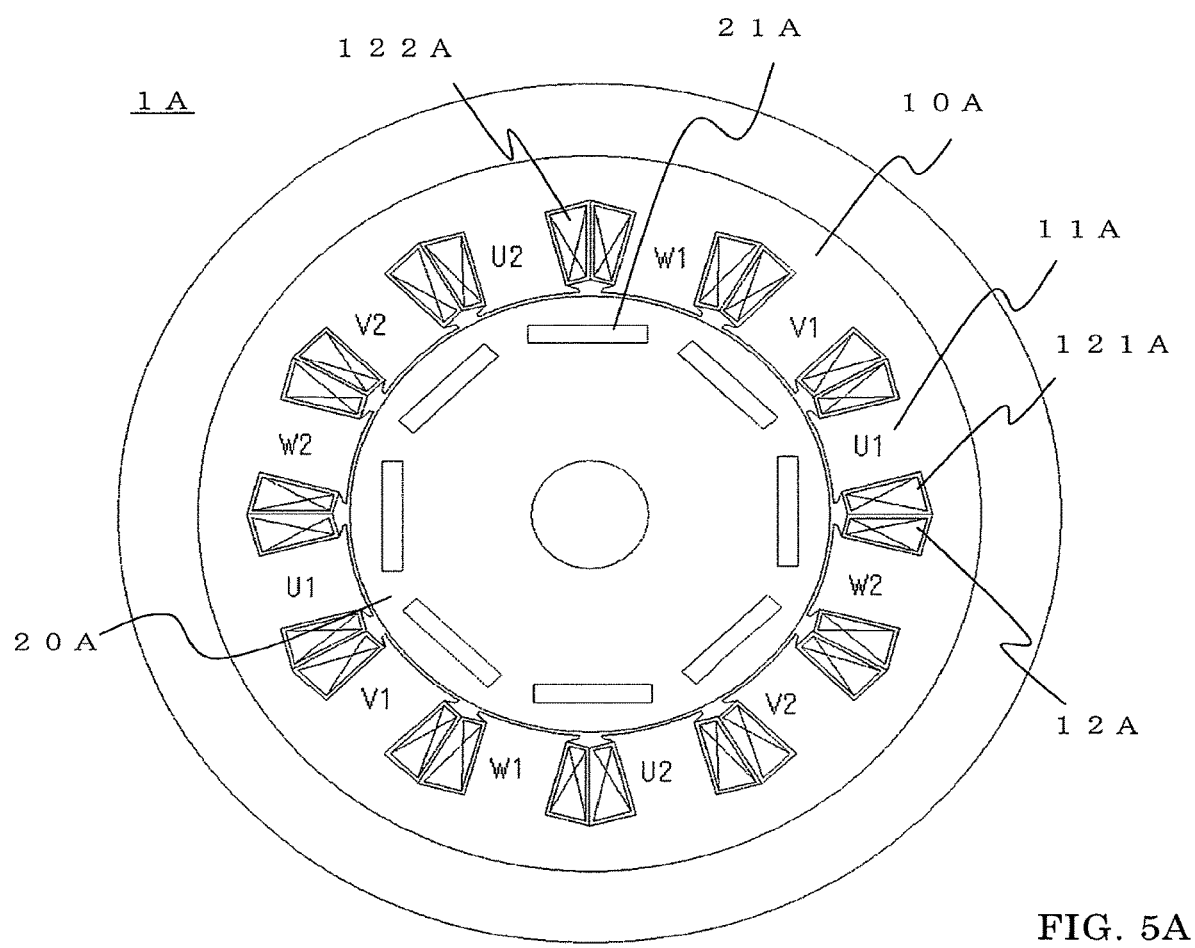
FIG. 5A is a cross-sectional view for illustrating the structure of a multiple three-phase motor in a second embodiment of the present invention.
Figure 5B:
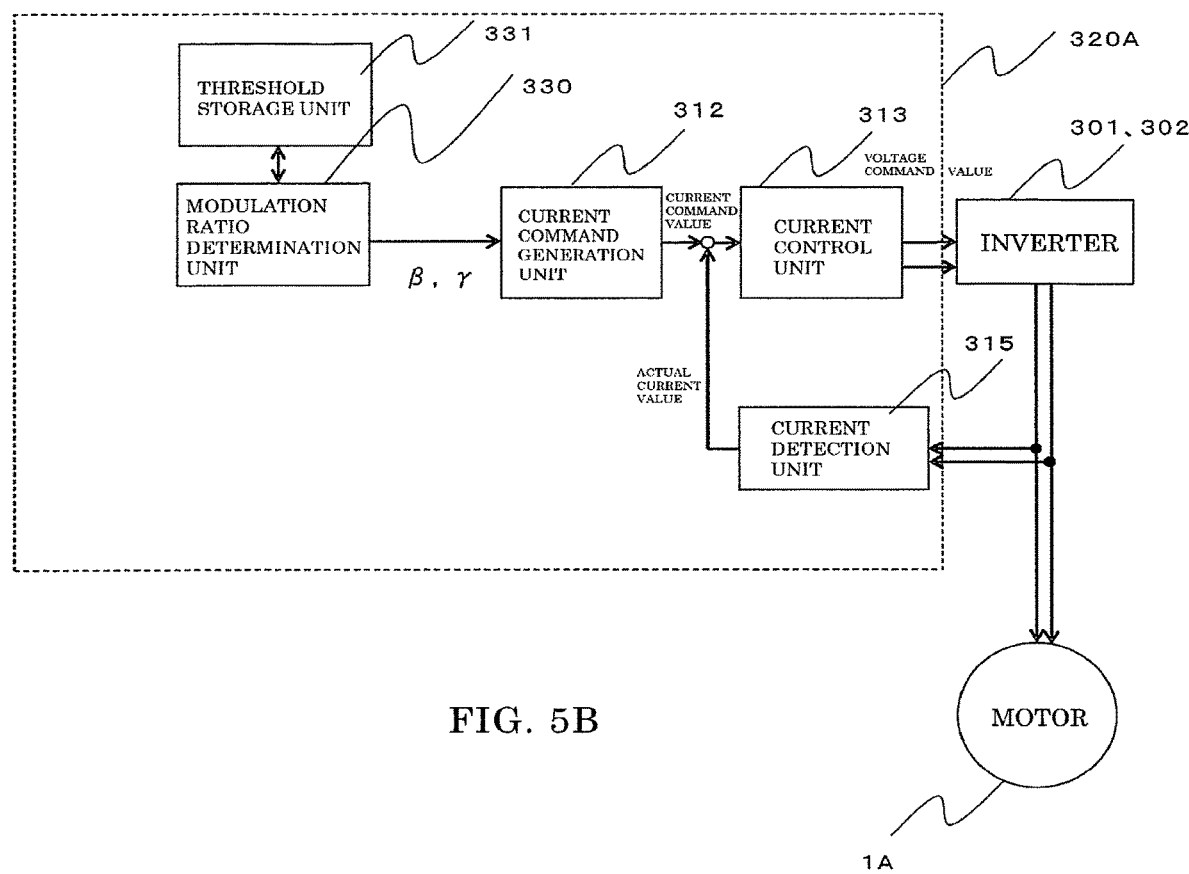
FIG. 5B is a block diagram for illustrating a configuration of a control device according to the second embodiment of the present invention.

FIG. 5A is a cross-sectional view for illustrating the structure of a multiple three-phase motor in a second embodiment of the present invention. Also in the second embodiment, as in the first embodiment, the case of dual three-phase is described as an example. Further, FIG. 5B is a block diagram for illustrating a configuration of a control device according to the second embodiment of the present invention. Also in the second embodiment, the configuration of the drive system 9 is basically the same as in the first embodiment, and hence a description thereof is omitted here.

A motor 1A is an 8-pole 12-slot concentrated winding dynamoelectric machine. The motor 1A includes a stator 10A and a rotor 20A.

The stator 10A has twelve teeth 11A, and phase coils 12A are wound in concentrated winding around the respective teeth 11A. The phase coils 12A include a group-1 phase coil 121A and a group-2 phase coil 122A. The group-1 phase coil 121A and the group-2 phase coil 122A are wound around every three teeth. As in the first embodiment, the group-1 phase coil 121A and the group-2 phase coil 122A are connected to individual neutral points, respectively, and are Y-connected.

The rotor 20A has eight magnetic poles with N-poles and S-poles being arranged alternately in the circumferential direction to be opposed to the stator. One magnetic pole is formed of one magnet 21A. The magnet 21A is arranged in a straight line.

In the second embodiment, the group-1 phase coil 121A and the group-2 phase coil 122A are spatially in-phase with each other in electric angle (phase difference: 0 rad). In other words, $\alpha=0$.

Further, in the second embodiment, as illustrated in FIG. 5B, a control device 320A includes a modulation ratio determination unit 330 and a threshold storage unit 331 instead of the carrier harmonic current amplitude comparison unit 310 and the carrier harmonic map 311 of FIG. 4. The threshold storage unit 331 stores in advance a threshold for a modulation ratio. In the second embodiment, the rotation detection unit 316, the torque command unit 317, and the power source state detection unit 318 of FIG. 4 are not particularly required.

Those are differences from the first embodiment.

To the modulation ratio determination unit 330, the modulation ratio and the threshold are input. The modulation ratio determination unit 330 is configured to compare the modulation ratio and the threshold with each other, to thereby compare the current amplitude of the primary component and the current amplitude of the secondary component of the carrier harmonic current. The term "modulation ratio" as used herein refers to a ratio of an output voltage of the inverter to the voltage command values.

Specifically, the threshold for the modulation ratio is set to, for example, 0.5. When determining that the modulation ratio is 0.5 or less as a result of the comparison between the modulation ratio and 0.5, the modulation ratio determination unit 330 determines that the current amplitude of the primary component is the current amplitude of the secondary component or more. In this case, with $\alpha=0$, the modulation ratio determination unit 330 sets the values of $\beta$ and $\gamma$ to $\beta=\pi$ and $\gamma=0$, respectively, based on the above-mentioned expressions (4) to (6).

In contrast, when the modulation ratio is more than 0.5, the modulation ratio determination unit 330 determines that the current amplitude of the primary component is less than the current amplitude of the secondary component. In this case, with $\alpha=0$, the modulation ratio determination unit 330 sets the values of $\beta$ and $\gamma$ to $\beta=0$, and $\gamma=\pi/2$, respectively, based on the above-mentioned expressions (7) and (8).

Other components and operation are the same as in the first embodiment, and hence a description thereof is omitted here.

In the second embodiment, with the above-mentioned configuration, similar effects as in the first embodiment are obtained.

Further, in the second embodiment, through provision of the modulation ratio determination unit 330, the comparison between the current amplitude of the primary component and the current amplitude of the secondary component can be performed only with comparison between the modulation ratio and the threshold, and hence the configuration of the control device 320A can be downsized.

In the above description, it is described that, when the current amplitude of the primary component of the carrier harmonic current is less than the current amplitude of the secondary component, the inverters 301 and 302 are PWM-controlled so that $\beta=0$ and $\gamma=\pi/2$. However, the present invention is not limited to that case, and the inverters 301 and 302 may be PWM-controlled so that $\beta=0$ and $\gamma=3\pi/2$, or $\beta=\pi$ and $\gamma=0$. In both cases, similar effects are obtained.

Further, in the above description, it is described that the modulation ratio to serve as the threshold is 0.5. However, the modulation ratio to serve as the threshold is different for each motor, and hence the value of the threshold may be set as appropriate for the motor.

Third Embodiment

Figure 6A:
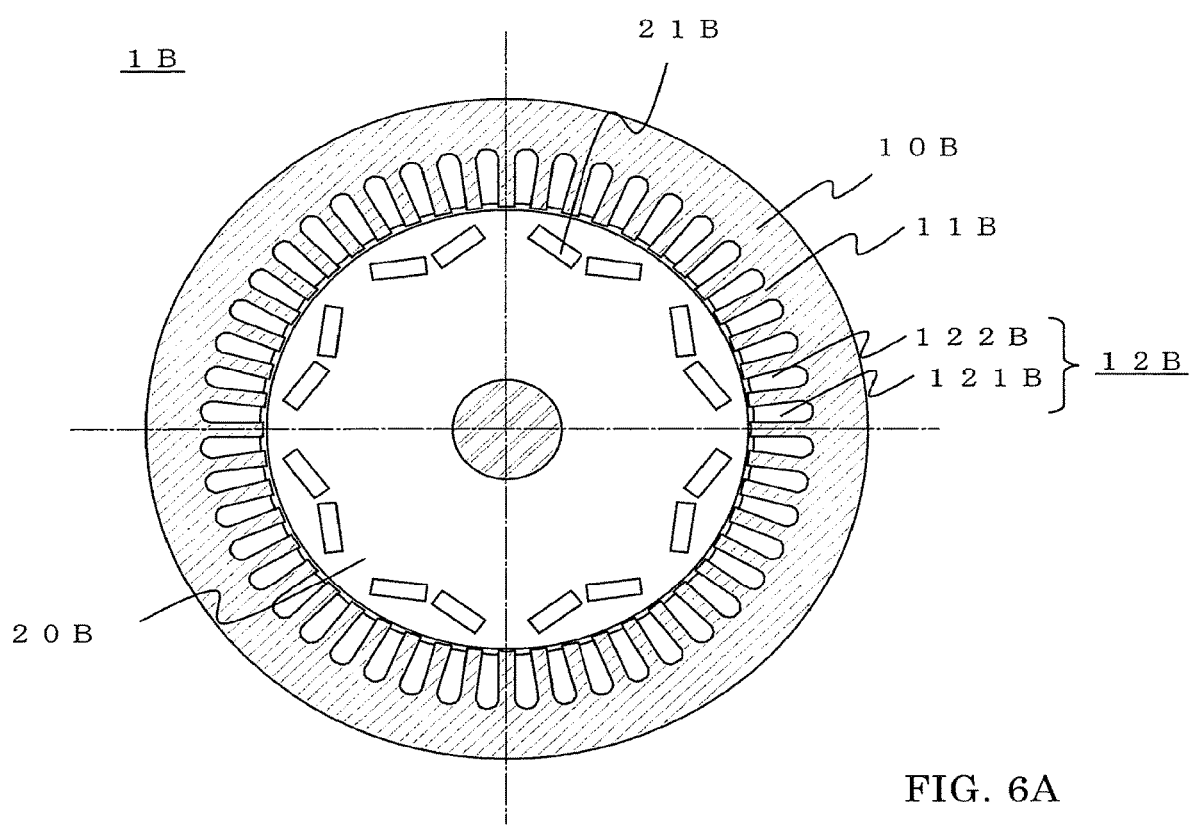
FIG. 6A is a cross-sectional view for illustrating the structure of a multiple three-phase motor in a third embodiment of the present invention.
Figure 6B:
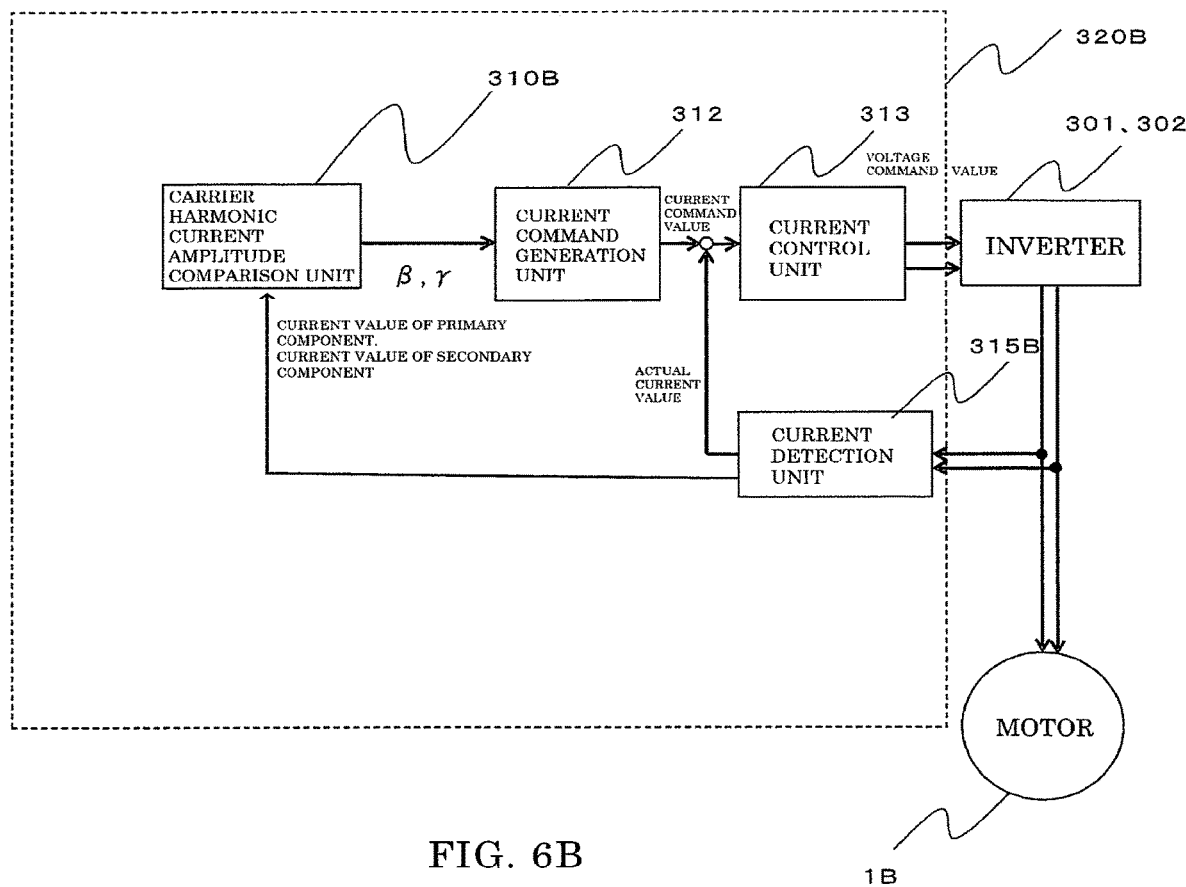
FIG. 6B is a block diagram for illustrating a configuration of a control device according to the third embodiment of the present invention.

FIG. 6A is a cross-sectional view for illustrating the structure of a multiple three-phase motor in a third embodiment of the present invention. Also in the third embodiment, as in the first embodiment, the case of dual three-phase is described as an example. Further, FIG. 6B is a block diagram for illustrating a configuration of a control device according to the third embodiment of the present invention. Also in the third embodiment, the configuration of the drive system 9 is basically the same as in the first embodiment, and hence a description thereof is omitted here.

A motor 1B is an 8-pole 48-slot distributed winding dynamoelectric machine. The motor 1B includes a stator 10B and a rotor 20B.

As illustrated in FIG. 6A, the stator 10B has forty-eight teeth 11B, around which phase coils 12B are wound in full pitch winding. The phase coils 12B include a group-1 phase coil 121B and a group-2 phase coil 122B. The group-1 phase coil 121B and the group-2 phase coil 122E are alternately wound in the circumferential direction. As in the first embodiment, the group-1 phase coil 121B and the group-2 phase coil 122B are connected to individual neutral points, respectively, and are Y-connected.

The rotor 20B has eight magnetic poles with N-poles and S-poles being arranged alternately in the circumferential direction to be opposed to the stator. One magnetic pole is formed of two magnets 21B. The magnet 21B is arranged in a V shape.

In the third embodiment, the group-1 phase coil 121B is spatially advanced in phase by $\pi/6$ rad in electric angle ahead of the group-2 phase coil 122B. In other words, $\alpha=\pi/6$.

In the third embodiment, as illustrated in FIG. 6B, a control device 320B includes a current detection unit 315B instead of the current detection unit 315 of FIG. 4. The control device 320B further includes a carrier harmonic current amplitude comparison unit 310B instead of the carrier harmonic current amplitude comparison unit 310 of FIG. 4. In the third embodiment, the rotation detection unit 316, the torque command unit 317, and the power source state detection unit 318 of FIG. 4 are not particularly required. Other components are the same as in FIG. 4, and hence a description thereof is omitted here.

As with the current detection unit 315 in the first embodiment, the current detection unit 315B is configured to detect an actual current of the motor 1B, and input the actual current to the current control unit 313. In the third embodiment, the current detection unit 315B is further configured to subject one period of the current waveform to frequency analysis to detect a current value of the primary component and a current value of the secondary component of the carrier harmonic current, and input the results to the carrier harmonic current amplitude comparison unit 310B.

When the current value of the primary component is the current value of the secondary component or more, the carrier harmonic current amplitude comparison unit 310B determines that the current amplitude of the primary component is the current amplitude of the secondary component or more. Then, with $\alpha=\pi/6$, the carrier harmonic current amplitude comparison unit 310B sets the values of $\beta$ and $\gamma$ to $\beta 5\pi/12$ and $\gamma=0$, respectively, based on the above-mentioned expressions (4) to (6), and outputs the results.

In contrast, when the current value of the primary component is less than the current value of the secondary component, the carrier harmonic current amplitude comparison unit 310B determines that the current amplitude of the primary component is less than the current amplitude of the secondary component. Then, with $\alpha=/6$, the carrier harmonic current amplitude comparison unit 310B sets the values of $\beta$ and $\gamma$ to $\beta=\pi/6$ and $\gamma=\pi/2$, respectively, based on the above-mentioned expressions (7) and (8), and outputs the results.

Other components and operation are the same as in the first embodiment, and hence a description thereof is omitted here.

In the third embodiment, with the above-mentioned configuration, similar effects as in the first embodiment are obtained.

Further, in the third embodiment, it is described that, when the current value of the primary component of the carrier harmonic current is less than the current value of the secondary component, the inverters 301 and 302 are PWM-controlled so that $\beta=\pi/6$ and $\gamma=\pi/2$. However, the present invention is not limited to that case, and the inverters 301 and 302 may be PWM-controlled so that $\beta=\pi/6$ and $\gamma=3\pi/2$, or $\rho=7\pi/6$ and $\gamma=0$. Also in that case, similar effects are obtained.

Fourth Embodiment

Figure 7A:
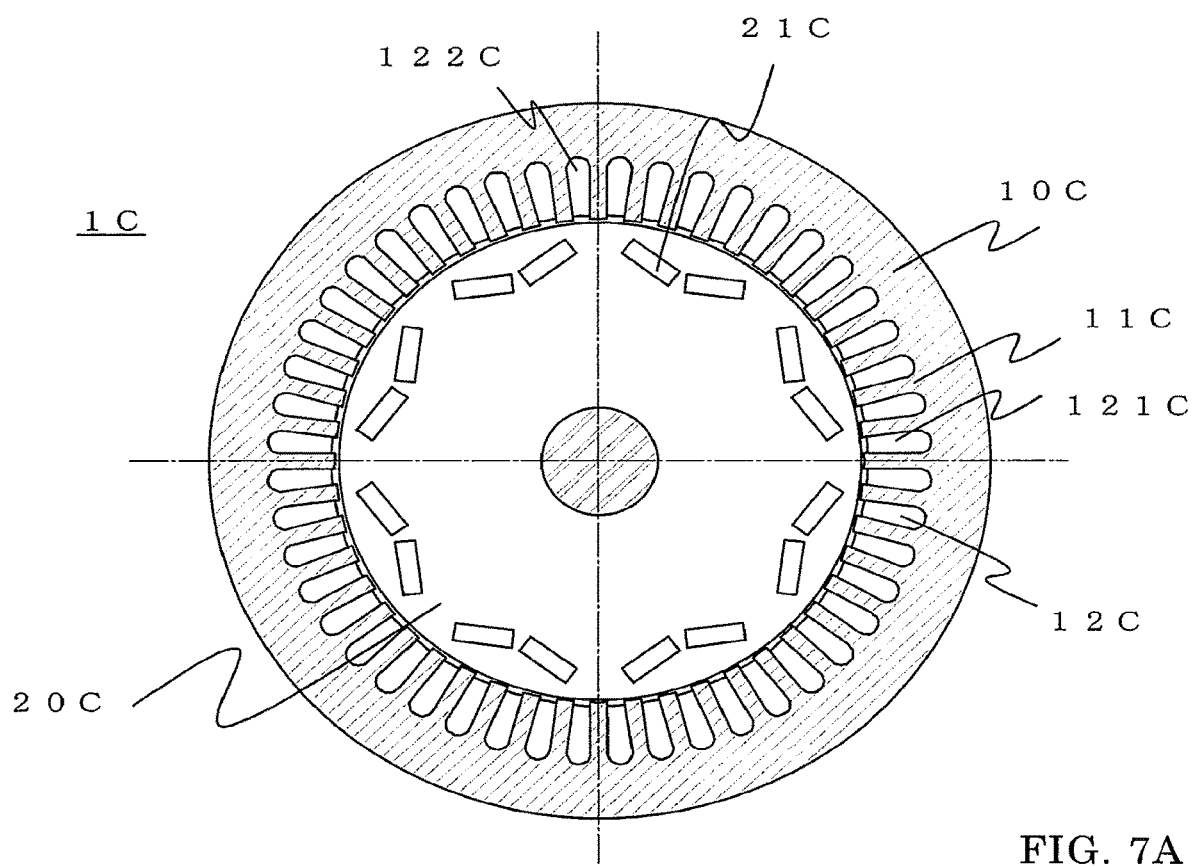
FIG. 7A is a cross-sectional view for illustrating the structure of a multiple three-phase motor in a fourth embodiment of the present invention.
Figure 7B:
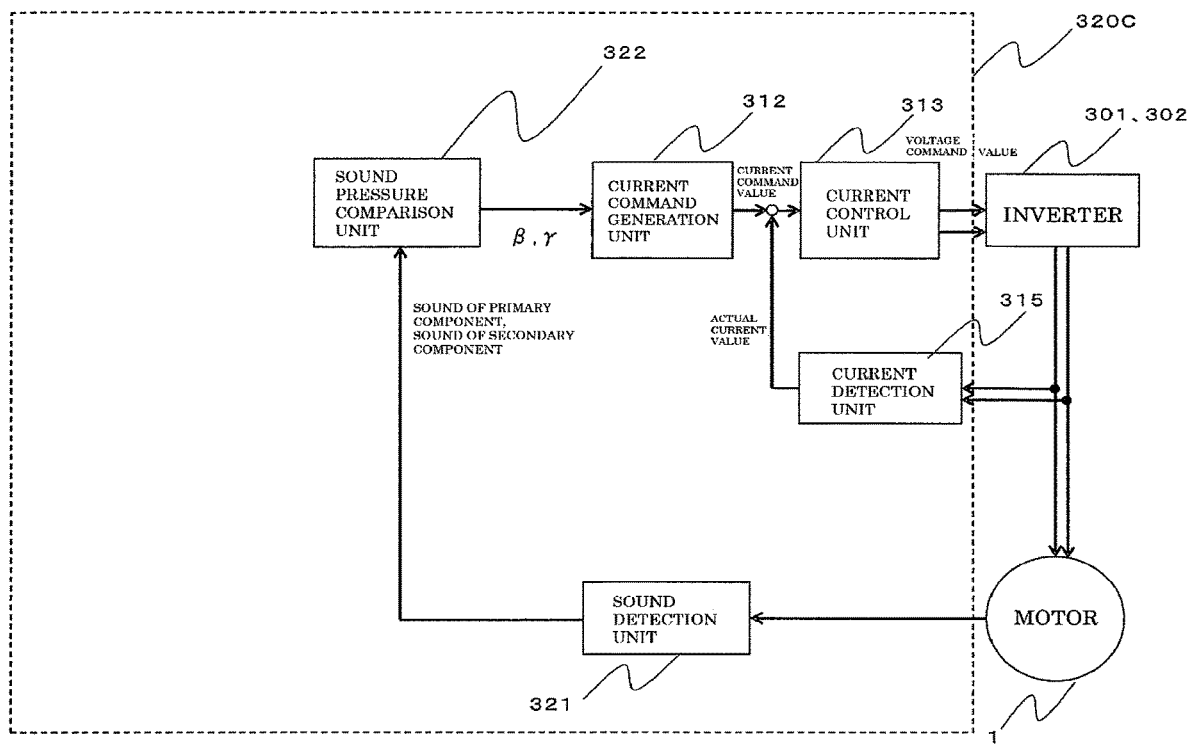
FIG. 7B is a block diagram for illustrating a configuration of a control device according to the fourth embodiment of the present invention.

FIG. 7A is a cross-sectional view for illustrating the structure of a multiple three-phase motor in a fourth embodiment of the present invention. Further, FIG. 7B is a block diagram for illustrating a configuration of a control device according to the fourth embodiment of the present invention. Also in the fourth embodiment, as in the first embodiment, the case of dual three-phase is described as an example. Also in the fourth embodiment, the configuration of the drive system 9 is basically the same as in the first embodiment, and hence a description thereof is omitted here.

A motor 1c is an 8-pole 48-slot distributed winding dynamoelectric machine. The motor 10 includes a stator 100 and a rotor 20C.

As illustrated in FIG. 7, the stator 100 has forty-eight teeth 11C, around which phase coils 12C are wound in short pitch winding. The phase coils 12C include a group-1 phase coil 121C and a group-2 phase coil 122C. The group-1 phase coil 121C and the group-2 phase coil 122C are wound every twelve teeth in the circumferential direction. As in the first embodiment, the group-1 phase coil 121C and the group-2 phase coil 122C are connected to individual neutral points, respectively, and are Y-connected.

The rotor 20C has eight magnetic poles with N-poles and S-poles being arranged alternately in the circumferential direction to be opposed to the stator 100. One magnetic pole is formed of two magnets 21C. The magnets 21C are arranged in a V shape.

The group-1 phase coil 121C and the group-2 phase coil 122C are spatially in-phase with each other in electric angle (phase difference: 0 rad). In other words, $\alpha=0$.

In the fourth embodiment, as illustrated in FIG. 7B, a control device 320C includes a sound detection unit 321 instead of the rotation detection unit 316 of FIG. 4. The control device 320C also includes a sound pressure comparison unit 322 instead of the carrier harmonic current amplitude comparison unit 310 of FIG. 4. In the fourth embodiment, the torque command unit 317, the carrier harmonic map 311, and the power source state detection unit 318 of FIG. 4 are not particularly required. The other components are the same as in FIG. 4, and hence a description thereof is omitted here.

The sound detection unit 321 is configured to subject sound acquired by a microphone (not shown), which is mounted outside an outer peripheral frame of the motor 1, to frequency analysis, and input sound information of the carrier primary component and sound information of the carrier secondary component to the sound pressure comparison unit 322.

The sound pressure comparison unit 322 is configured to compare a sound pressure of the carrier primary component and a sound pressure of the carrier secondary component based on the sound information of the carrier primary component and the sound information of the carrier secondary component.

When the sound pressure of the carrier primary component is the sound pressure of the carrier secondary component or more, the sound pressure comparison unit 322 determines that the current amplitude of the primary component is the current amplitude of the secondary component or more. Then, with $\alpha=0$, the sound pressure comparison unit 322 allows electric currents to pass so that the values of $\beta$ and $\gamma$ are set as follows: $\beta=\pi$ and $\gamma=0$, respectively, based on the above-mentioned expressions (4) to (6).

In contrast, when the sound pressure of the carrier primary component is less than the sound pressure of the carrier secondary component, the sound pressure comparison unit 322 determines that the current amplitude of the primary component is less than the current amplitude of the secondary component. Then, with $\alpha=0$, the sound pressure comparison unit 322 allows electric currents to pass so that $\beta=0$ and $\gamma=\pi/2$ based on the above-mentioned expressions (7) and (8).

Other components and operation are the same as in the first embodiment, and hence a description thereof is omitted here.

In the fourth embodiment, with the above-mentioned configuration, similar effects as in the first embodiment are obtained.

Further, in the fourth embodiment, it is described that, when the current value of the primary component of the carrier harmonic current is less than the current value of the secondary component, the inverters 301 and 302 are PWM-controlled so that $\beta=0$ and $\gamma=\pi/2$. However, the present invention is not limited to that case, and the inverters 301 and 302 may be PWM-controlled so that $\beta=0$ and $\gamma=3\pi/2$, or $\beta=\pi$ and $\gamma=0$. In both cases, similar effects are obtained.

Still further, in the above description, it is described that the result of the frequency analysis of the sound acquired by the microphone, which is obtained by the sound detection unit 321, is used. However, the present invention is not limited to that case, and an acceleration sensor may be mounted on the outer peripheral frame of the motor 1 instead of the microphone, and a result of frequency analysis of an acceleration acquired by the acceleration sensor may be used. In that case, instead of the sound detection unit 321 of FIG. 7B, an acceleration detection unit configured to perform the frequency analysis on the acceleration acquired by the acceleration sensor is provided. Further, instead of the sound pressure comparison unit 322 of FIG. 7B, an acceleration comparison unit configured to compare an acceleration of the carrier primary component and an acceleration of the carrier secondary component is provided. Also with this method, similar effects are obtained.

Fifth Embodiment

Figure 8A:
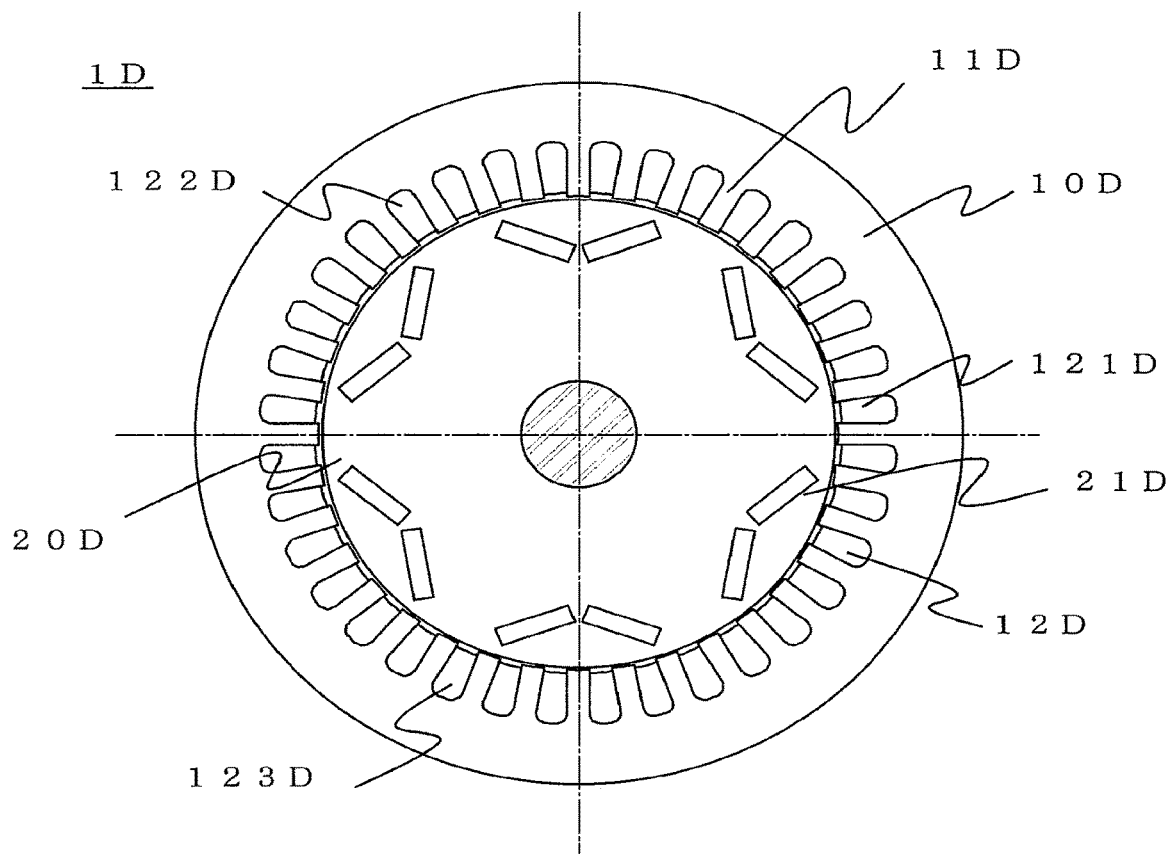
FIG. 8A is a cross-sectional view for illustrating the structure of a multiple three-phase motor in a fifth embodiment of the present invention.
Figure 8B:
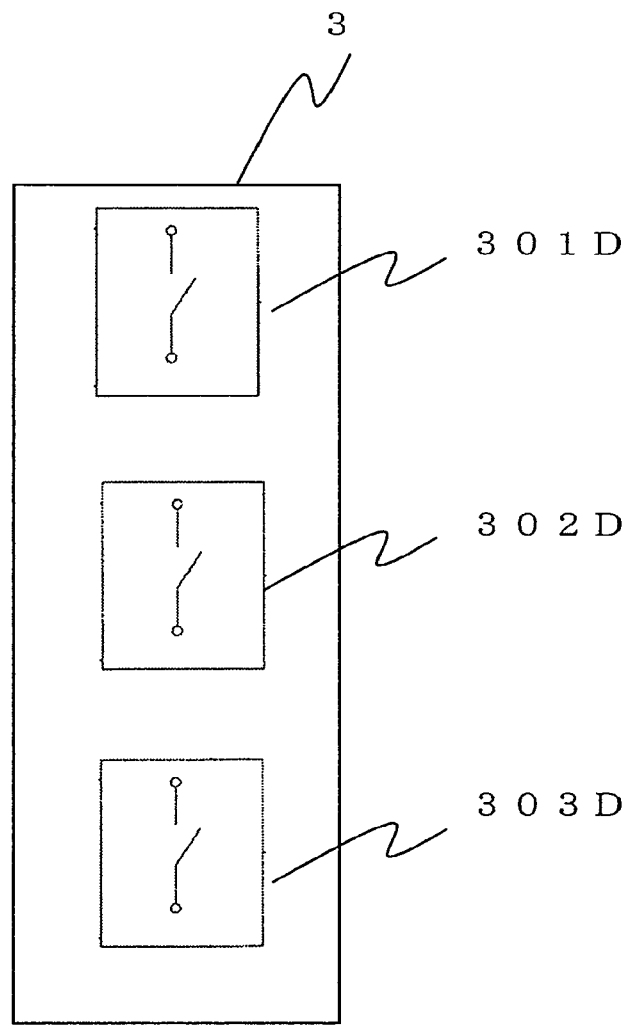
FIG. 8B is a block diagram for illustrating a configuration of an inverter of a multiple three-phase drive system in the fifth embodiment of the present invention.

FIG. 8A is a cross-sectional view for illustrating the structure of a multiple three-phase motor in a fifth embodiment of the present invention. FIG. 8B is a block diagram for illustrating a configuration of an inverter of a multiple three-phase drive system in the fifth embodiment of the present invention. In the fifth embodiment, a case of triple three-phase is described as an example. Also in the fifth embodiment, the configuration of the drive system 9 is basically the same as in the first embodiment, and hence a description thereof is omitted here.

A motor 1D is a 6-pole 36-slot distributed winding dynamoelectric machine. The motor 1D includes a stator 10D and a rotor 20D.

As illustrated in FIG. 8A, the stator 10D has thirty-six teeth 11D, around which phase coils 12D are wound in full pitch winding. The phase coils 12D include a group-1 phase coil 121D, a group-2 phase coil 122D, and a group-3 phase coil 123D.

The group-1 phase coil 121D, the group-2 phase coil 122D, and the group-3 phase coil 123D are wound every twelve teeth in the circumferential direction. The group-1 phase coil 121D, the group-2 phase coil 122D, and the group-3 phase coil 123D are connected to individual neutral points, respectively, and are Y-connected.

The rotor 20D has six magnetic poles with N-poles and S-poles being arranged alternately in the circumferential direction to be opposed to the stator 10D. One magnetic pole is formed of two magnets 21D. The magnets 21D are arranged in a V shape.

The group-1 phase coil 121D, the group-2 phase coil 122D, and the group-3 phase coil 123D are spatially in-phase with each other in electric angle (phase difference: 0 rad). In other words, $\alpha=0$.

Further, in the fifth embodiment, as illustrated in FIG. 8B, the inverter 3 includes three three-phase inverters 301D, 302D, and 303D. Therefore, to the group-1 phase coil 121D, the group-2 phase coil 122D, and the group-3 phase coil 123D, the individual three-phase inverters 301D, 302D, and 303D are connected, respectively. The three-phase inverters 301D, 302D, and 303D are connected to the DC power source 5.

The three-phase inverters 301D, 302D, and 303D are configured to supply three-phase AC power of an appropriate phase to the group-1 phase coil 121D, the group-2 phase coil 122D, and the group-3 phase coil 123D, respectively, or regenerate AC power from the motor 1D. A time phase difference between an electric current supplied to the group-1 phase coil 121D and an electric current supplied to the group-2 phase coil 122D, and a time phase difference between the electric current supplied to the group-2 phase coil 122D and an electric current supplied to the group-3 phase coil 123D is represented by $\beta$.

The three-phase inverters 301D, 302D, and 303D are PWM-controlled with the same carrier frequency. The three-phase inverters 301D, 302D, and 303D provide a phase difference of $\gamma$ rad with the PWM carrier chopping phase being set so that one carrier period is $2\pi$ rad.

In the fifth embodiment, the carrier harmonic map 311 is configured to store in advance, at each operating point of a rotational speed and torque of the motor 1D, information on the current amplitude of the primary component of the carrier harmonic current having the carrier harmonic current amplitude and the current amplitude of the carrier secondary component during PWM driving. Specifically, in the carrier harmonic map 311, the current amplitude of the primary component of the carrier harmonic current and the current amplitude of the carrier secondary component are written for each torque command value, each rotational speed of the motor 1D, and each power supply voltage of the DC power source 5.

The carrier harmonic current amplitude comparison unit 310 extracts, based on the torque command value, the rotational speed of the motor 1D, and the power supply voltage of the DC power source 5, the current amplitude of the primary component and the current amplitude of the secondary component of the carrier harmonic current that correspond to those values from the carrier harmonic map 311. The carrier harmonic current amplitude comparison unit 310 compares the current amplitude of the primary component and the current amplitude of the secondary component with each other.

When the current amplitude of the primary component is the current amplitude of the secondary component or more, with $\alpha=0$, the carrier harmonic current amplitude comparison unit 310 sets the values of $\beta$ and $\gamma$ to $\beta=\pi/3$ and $\gamma=0$, respectively, based on the above-mentioned expressions (4) to (6), and outputs the results.

In contrast, when the current amplitude of the primary component is less than the current amplitude of the secondary component, with $\alpha=0$, the carrier harmonic current amplitude comparison unit 310 sets the values of $\beta$ and $\gamma$ to $\beta=4\pi/3$ and $\gamma=\pi$, respectively, based on the above-mentioned expressions (7) and (8), and outputs the results.

Other components and operation are the same as in the first embodiment, and hence a description thereof is omitted here.

In the fifth embodiment, with the above-mentioned configuration, similar effects as in the first embodiment are obtained.

Further, in the fifth embodiment, it is described that, when the current value of the primary component of the carrier harmonic current is the current value of the secondary component or more, the inverters 301D to 303D are PWM-controlled so that β=π/3 and γ=0. However, the present invention is not limited to that case, and the inverters 301D to 303D may be PWM-controlled so that β=4π/3 and γ=0. In any case, similar effects are obtained.

Still further, in the fifth embodiment, it is described that, when the current value of the primary component of the carrier harmonic current is less than the current value of the secondary component, the inverters 301D to 303D are PWM-controlled so that β=4π/3 and γ=π. However, the present invention is not limited to that case, the inverters 301D to 303D may be PWM-controlled so that β=4π/3 and γ=0. In both cases, similar effects are obtained.

Sixth Embodiment

Figure 9A:
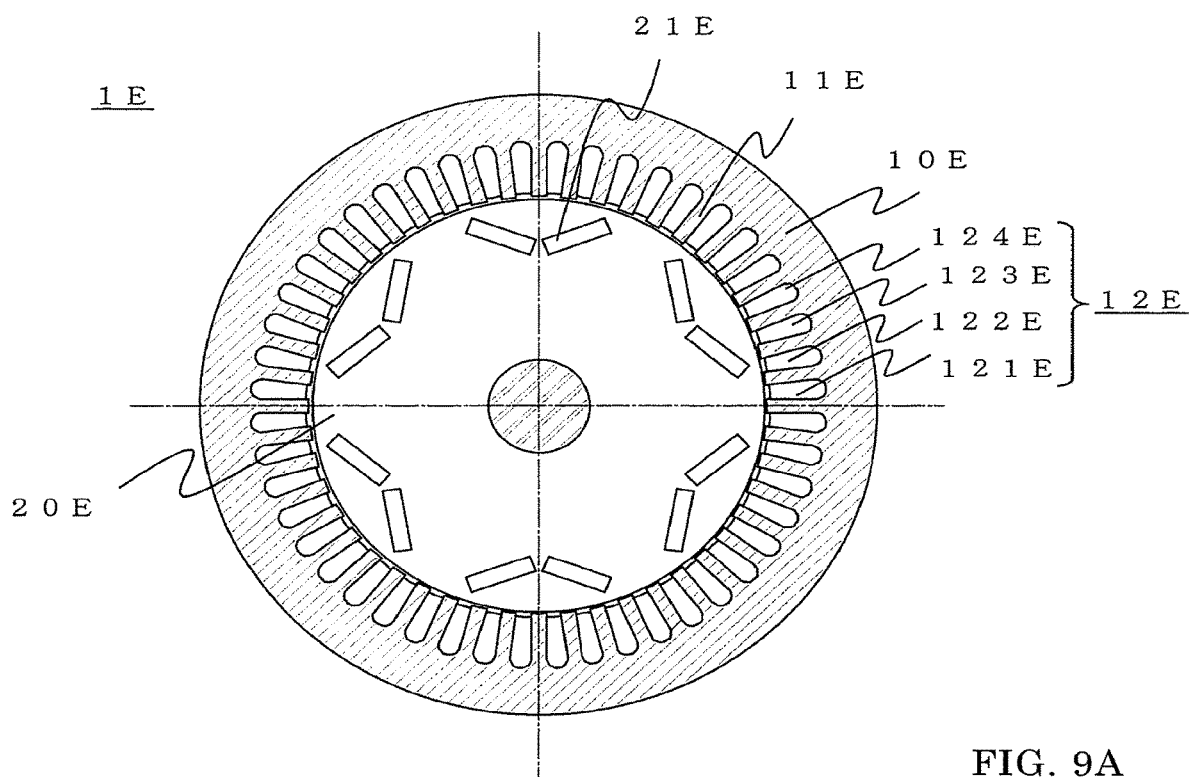
FIG. 9A is a cross-sectional view for illustrating the structure of a multiple three-phase motor in a sixth embodiment of the present invention.
Figure 9B:
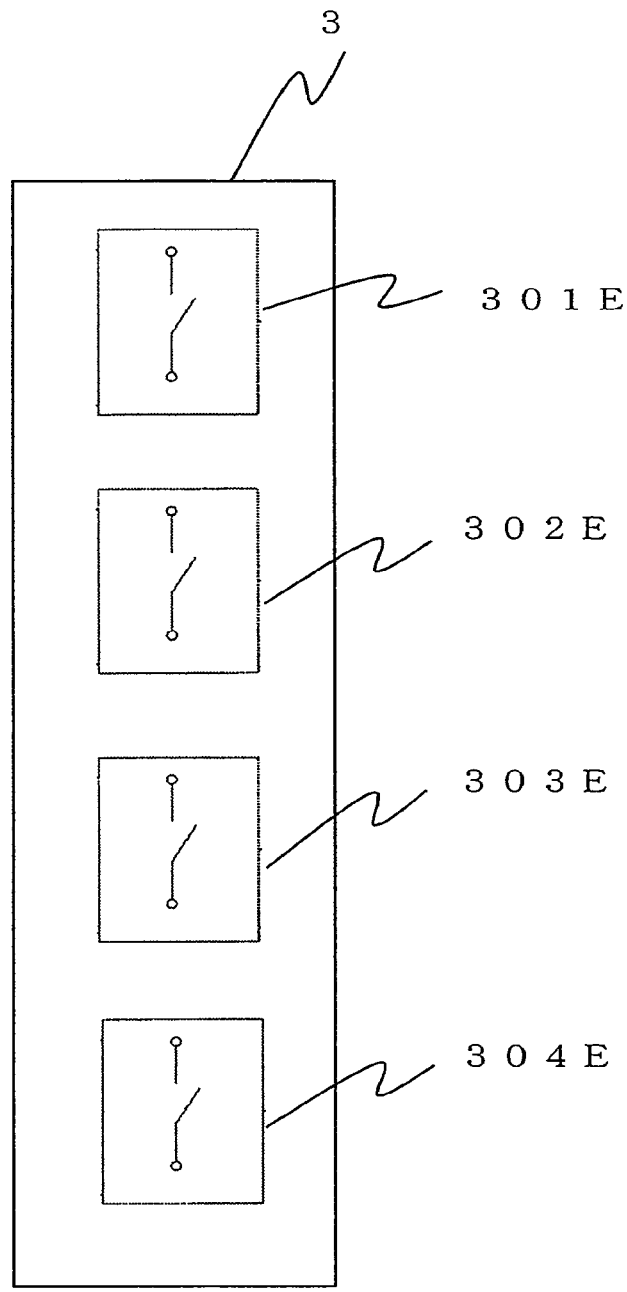
FIG. 9B is a block diagram for illustrating a configuration of an inverter of a multiple three-phase drive system in the sixth embodiment of the present invention.

FIG. 9A is a cross-sectional view for illustrating the structure of a multiple three-phase motor in a sixth embodiment of the present invention. FIG. 9B is a block diagram for illustrating a configuration of an inverter of a multiple three-phase drive system in the sixth embodiment of the present invention. In the sixth embodiment, a case of quadruple three-phase is described as an example. Also in the sixth embodiment, the configuration of the drive system 9 is basically the same as in the first embodiment, and hence a description thereof is omitted here.

A motor 1E is a 6-pole 48-slot distributed winding dynamoelectric machine. The motor 1E includes a stator 10E and a rotor 20E.

As illustrated in FIG. 9A, the stator 10E has forty-eight teeth 11E, and phase coils 12E are wound around the teeth 11E in full pitch winding. The phase coils 12E include a group-1 phase coil 121E, a group-2 phase coil 122E, a group-3 phase coil 123E, and a group-4 phase coil 124E. The group-1 phase coil 121E, the group-2 phase coil 122E, the group-3 phase coil 123E, and the group-4 phase coil 124E are wound in the stated order in the circumferential direction. The group-1 phase coil 121E, the group-2 phase coil 122E, the group-3 phase coil 123E, and the group-4 phase coil 124E are connected to individual neutral points, respectively, and are Y-connected.

The rotor 20E has six magnetic poles with N-poles and S-poles being arranged alternately in the circumferential direction to be opposed to the stator 10E. One magnetic pole is formed of two magnets 21E. The magnets 21E are arranged in a V shape.

The group-1 phase coil 121E is spatially advanced in phase by π/12 rad in electric angle ahead of the group-2 phase coil 122E. The group-2 phase coil 122E is spatially advanced in phase by π/12 rad in electric angle ahead of the group-3 phase coil 123E. The group-3 phase coil 123E is spatially advanced in phase by π/12 rad in electric angle ahead of the group-4 phase coil 124E. In other words, α=π/12 rad.

Further, in the sixth embodiment, as illustrated in FIG. 9B, the inverter 3 includes four three-phase inverters 301E, 302E, 303E, and 304E. Therefore, to the group-1 phase coil 121E, the group-2 phase coil 122E, the group-3 phase coil 123E, and the group-4 phase coil 124E, the individual three-phase inverters 301E, 302E, 303E, and 304E are connected, respectively. The three-phase inverters 301E, 302E, 303E, and 304E are connected to the DC power source 5.

The three-phase inverters 301E, 302E, 303E, and 304E are configured to supply three-phase AC power of an appropriate phase to the group-1 phase coil 121E, the group-2 phase coil 122E, the group-3 phase coil 123E, and the group-4 phase coil 124E, respectively, or regenerate AC power from the motor 1E. A time phase difference between an electric current supplied to the group-1 phase coil 121E and an electric current supplied to the group-2 phase coil 122E, a time phase difference between the electric current supplied to the group-2 phase coil 122E and an electric current supplied to the group-3 phase coil 123E, and a time phase difference between the electric current supplied to the group-3 phase coil 123E and an electric current supplied to the group-4 phase coil 124E are each represented by β.

The three-phase inverters 301E, 302E, 303E, and 304E are PWM-controlled with same carrier frequency. In the PWM carrier chopping phase between the inverters 301E and 302E, when one carrier period is 2π rad, a time phase difference of γ rad is provided. Further, in the PWM carrier chopping phase between the inverters 302E and 303E, when one carrier period is 2n rad, a time phase difference of γ rad is provided. Still further, in the PWM carrier chopping phase between the inverters 303E and 304E, when one carrier period is 2π rad, a time phase difference of γ rad is provided.

In the sixth embodiment, the carrier harmonic map 311 stores in advance, at each operating point of the rotational speed and torque of the motor 1E, information on the current amplitude of the primary component of the carrier harmonic current having the carrier harmonic current amplitude and the current amplitude of the carrier secondary component during PWM driving. Specifically, in the carrier harmonic map 311, the current amplitude of the primary component of the carrier harmonic current and the current amplitude of the carrier secondary component are stored for each torque command value, each rotational speed of the motor 1E, and each power supply voltage of the DC power source 5.

The carrier harmonic current amplitude comparison unit 310 extracts, based on the torque command value, the rotational speed of the motor 1E, and the power supply voltage of the DC power source 5, the current amplitude of the primary component and the current amplitude of the secondary component of the carrier harmonic current that correspond to those values from the carrier harmonic map 311.

In the sixth embodiment, when the current amplitude of the primary component of the carrier harmonic current is equal to or more than the current amplitude of the secondary component, with α=π/12, the carrier harmonic current amplitude comparison unit 310 sets the values of β and γ to β=11π/24 and γ=0, respectively, based on the above-mentioned expressions (4) to (6), and outputs the results.

In contrast, when the current amplitude of the secondary component of the carrier harmonic current is more than the current amplitude of the carrier primary component, with α=π/12, the carrier harmonic current amplitude comparison unit 310 sets the values of β and γ to β=π/12 and γ=0, respectively, based on the above-mentioned expressions (7) and (8), and outputs the results.

Other components and operation are the same as in the first embodiment.

In the sixth embodiment, with the above-mentioned configuration, similar effects as in the first embodiment are obtained.

Further, in the sixth embodiment, it is described that, when the current value of the primary component of the carrier harmonic current is the current value of the secondary component or more, the inverters 301E to 304E are PWM-controlled so that β=11π/24 and γ=0. However, the present invention is not limited to that case, and the inverters 301E to 304E may be PWM-controlled so that β=23π/24 and γ=0, β=5π/24 and γ=0, or β=29π/24 and γ=0. In all cases, similar effects are obtained.

Still further, in the sixth embodiment, it is described that, when the current value of the primary component of the carrier harmonic current is less than the current value of the secondary component, the inverters 301E to 304E are PWM-controlled so that $\beta=\pi/12$ and $\gamma=0$. However, the present invention is not limited to that case, and the inverters 301E to 304E may be PWM-controlled so that $\beta=19\pi/12$ and $\gamma=0$, $\beta=7\pi/12$ and $\gamma=\pi/2$, or $\beta=7\pi/12$ and $\gamma=3\pi/2$. Also in those cases, similar effects are obtained.

In the first to sixth embodiments described above, the control devices 320, 320A, 320B, and 320C each include a controller. The controller includes a processor and a memory. Functions of the components forming the control devices 320, 320A, 320B, and 320C are achieved by software, firmware, or a combination thereof. Software and firmware are described as programs, and stored in the memory. The processor reads out and executes the programs stored in the memory to achieve the functions of the components of the control devices 320, 320A, 320B, and 320C.

REFERENCE SIGNS LIST 1, 1A, 1B, 1C, 1D, 1E motor; 3 inverter; 10, 10A, 10B, 100, 10D, 10E stator; 20, 20A, 20B, 20C, 20D, 20E rotor; 12, 12A, 12B, 12C, 12D, 12E phase coil; 21, 21A, 21B, 21C, 21D, 21E magnet

The invention claimed is:

1. A control method for a dynamoelectric machine, which is to be executed in a control device configured to control a voltage to be applied to an N-fold three-phase dynamoelectric machine, where N is an integer of 2 or more,
the N-fold three-phase dynamoelectric machine including N groups of phase coils,
the phase coils of the N groups being connected to individual three-phase inverters, respectively,
the control method for a dynamoelectric machine comprising setting, when a space phase difference of in-phase coils of the N groups is represented by $\alpha$ in electric angle, a time phase difference of electric currents to be supplied from the individual three-phase inverters to the in-phase coils of the N groups is represented by $\beta$ in electric angle, and a time phase difference of carrier frequencies with which the individual three-phase inverters are PWM-controlled, respectively, is represented by $\gamma$ with respect to one carrier period, values of the time phase difference $\beta$ and the time phase difference $\gamma$ so that any one or both of the following relationships are satisfied: $\gamma=\pm(\alpha+2\beta-2\pi/M-2\pi K)$, and $\gamma=\pm(\alpha-\beta-2\pi/M-2\pi K)/2$, based on a result of comparison between a current amplitude of a primary component and a current amplitude of a secondary component of a carrier harmonic current and a value of the space phase difference $\alpha$, and PWM-controlling the individual three-phase inverters to control the voltage to be applied to the N-fold three-phase dynamoelectric machine.

2. The control method for a dynamoelectric machine according to claim 1, wherein at least one of the time phase difference $\beta$ or the time phase difference $\gamma$ is variable during operation of the N-fold three-phase dynamoelectric machine.

3. The control method for a dynamoelectric machine according to claim 1, further comprising:
setting, when the current amplitude of the primary component of the carrier harmonic current is the current amplitude of the secondary component or more, the values of the time phase difference $\beta$ and the time phase difference $\gamma$ so that the following relationship is satisfied: $\gamma=\pm(\alpha+2\beta-2\pi/M-2\pi K)$; and
setting, when the current amplitude of the primary component of the carrier harmonic current is less than the current amplitude of the secondary component, the values of the time phase difference $\beta$ and the time phase difference $\gamma$ so that the following relationship is satisfied: $\gamma=\pm(\alpha-\beta-2\pi/M-2\pi K)/2$.

4. The control method for a dynamoelectric machine according to claim 2, further comprising:
setting, when the current amplitude of the primary component of the carrier harmonic current is the current amplitude of the secondary component or more, the values of the time phase difference $\beta$ and the time phase difference $\gamma$ so that the following relationship is satisfied: $\gamma=\pm(\alpha+2\beta-2\pi/M-2\pi K)$; and
setting, when the current amplitude of the primary component of the carrier harmonic current is less than the current amplitude of the secondary component, the values of the time phase difference $\beta$ and the time phase difference $\gamma$ so that the following relationship is satisfied: $\gamma=\pm(\alpha-\beta-2\pi/M-2\pi K)/2$.

5. A control device for a dynamoelectric machine, comprising a controller configured to control a voltage to be applied to an N-fold three-phase dynamoelectric machine, where N is an integer of 2 or more,
the N-fold three-phase dynamoelectric machine including N groups of phase coils,
the phase coils of the N groups being connected to individual three-phase inverters, respectively,
the controller being configured to set, when a space phase difference of in-phase coils of the N groups is represented by $\alpha$ in electric angle, a time phase difference of electric currents to be supplied from the individual three-phase inverters to the in-phase coils of the N groups is represented by $\beta$ in electric angle, and a time phase difference of carrier frequencies with which the individual three-phase inverters are PWM-controlled, respectively, is represented by $\gamma$ in electric angle with respect to one carrier period, values of the time phase difference $\beta$ and the time phase difference $\gamma$ so that any one or both of the following relationships are satisfied: $\gamma=\pm(\alpha+2\beta-2\pi/M-2\pi K)$, and $\gamma=\pm(\alpha-\beta-2\pi/M-2\pi K)/2$, based on a result of comparison between a current amplitude of a primary component and a current amplitude of a secondary component of a carrier harmonic current and a value of the space phase difference $\alpha$, and PWM-control the individual three-phase inverters to control the voltage to be applied to the N-fold three-phase dynamoelectric machine.

6. The control device for a dynamoelectric machine according to claim 5, wherein the controller is configured to set at least one of the time phase difference $\beta$ or the time phase difference $\gamma$ variable during operation of the N-fold three-phase dynamoelectric machine.

7. The control device for a dynamoelectric machine according to claim 5, wherein the controller is configured to:
set, when the current amplitude of the primary component of the carrier harmonic current is the current amplitude of the secondary component or more, the values of the time phase difference $\beta$ and the time phase difference $\gamma$ so that the following relationship is satisfied: $\gamma=\pm(\alpha+2\beta-2\pi/M-2\pi K)$; and
set, when the current amplitude of the primary component of the carrier harmonic current is less than the current amplitude of the secondary component, the values of the time phase difference $\beta$ and the time phase difference $\gamma$ so that the following relationship is satisfied: $\gamma=\pm(\alpha-\beta-2\pi/M-2\pi K)/2$.

8. The control device for a dynamoelectric machine according to claim 6, wherein the controller is configured to:
   set, when the current amplitude of the primary component of the carrier harmonic current is the current amplitude of the secondary component or more, the values of the time phase difference $\beta$ and the time phase difference $\gamma$ so that the following relationship is satisfied: $\gamma=\pm(\alpha+2\beta-2\pi/M-2\pi K)$; and
   set, when the current amplitude of the primary component of the carrier harmonic current is less than the current amplitude of the secondary component, the values of the time phase difference $\beta$ and the time phase difference $\gamma$ so that the following relationship is satisfied: $\gamma=\pm(\alpha-\beta-2\pi/M-2\pi K)/2$.

9. A drive system, comprising:
   an N-fold three-phase dynamoelectric machine including N groups of phase coils, where N is an integer of 2 or more;
   an N-fold three-phase inverter including N three-phase inverters configured to supply electric currents to the phase coils of the N groups of the N-fold three-phase dynamoelectric machine; and
   a control device configured to control the N three-phase inverters,
   wherein the phase coils of the N groups of the N-fold three-phase dynamoelectric machine are connected to the N three-phase inverters in a one-on-one relationship, and
   wherein the control device is configured to set, when a space phase difference of in-phase coils of the N groups is represented by $\alpha$ in electric angle, a time phase difference of electric currents to be supplied from the N three-phase inverters to the in-phase coils of the N groups is represented by $\beta$ in electric angle, a time phase difference of carrier frequencies with which the N three-phase inverters are PWM-controlled, respectively, is represented by $\gamma$ in electric angle with respect to one carrier period, values of the time phase difference $\beta$ and the time phase difference $\gamma$ so that any one or both of the following relationships are satisfied: $\gamma=\pm(\alpha+2\beta-2\pi/M-2\pi K)$, and $\gamma=\pm(\alpha-\beta-2\pi/M-2\pi K)/2$, based on a result of comparison between a current amplitude of a primary component and a current amplitude of a secondary component of a carrier harmonic current, and a value of the space phase difference $\alpha$.

10. The drive system according to claim 9, wherein the control device is configured to set at least one of the time phase difference $\beta$ or the time phase difference $\gamma$ variable during operation of the N-fold three-phase dynamoelectric machine.

11. The drive system for a dynamoelectric machine according to claim 9, wherein the control device is configured to:
    set, when the current amplitude of the primary component of the carrier harmonic current is the current amplitude of the secondary component or more, the values of the time phase difference $\beta$ and the time phase difference $\gamma$ so that the following relationship is satisfied: $\gamma=\pm(\alpha+2\beta-2\pi/M-2\pi K)$; and
    set, when the current amplitude of the primary component of the carrier harmonic current is less than the current amplitude of the secondary component, the values of the time phase difference $\beta$ and the time phase difference $\gamma$ so that the following relationship is satisfied: $\gamma=\pm(\alpha-\beta-2\pi/M-2\pi K)/2$.

12. The drive system for a dynamoelectric machine according to claim 10, wherein the control device is configured to:
    set, when the current amplitude of the primary component of the carrier harmonic current is the current amplitude of the secondary component or more, the values of the time phase difference $\beta$ and the time phase difference $\gamma$ so that the following relationship is satisfied: $\gamma=\pm(\alpha+2\beta-2\pi/M-2\pi K)$; and
    set, when the current amplitude of the primary component of the carrier harmonic current is less than the current amplitude of the secondary component, the values of the time phase difference $\beta$ and the time phase difference $\gamma$ so that the following relationship is satisfied: $\gamma=\pm(\alpha-\beta-2\pi/M-2\pi K)/2$.

* * * * *